United States Patent
Hol et al.

(10) Patent No.: US 8,860,601 B2
(45) Date of Patent: Oct. 14, 2014

(54) SURVEILLANCE SYSTEM COMPRISING A RADAR ANTENNA MOUNTED ON A BLADE OF A WINDMILL

(75) Inventors: Willem Andries Hol, Hengelo (NL); Ton Peerdeman, Apeldoorn (NL); Radmila Erkocevic-Pribic, Delfgauw (NL)

(73) Assignee: Thales Nederland B.V., Hengelo (NL)

( * ) Notice: Subject to any disclaimer, the term of this patent is extended or adjusted under 35 U.S.C. 154(b) by 137 days.

(21) Appl. No.: 13/132,500

(22) PCT Filed: Nov. 27, 2009

(86) PCT No.: PCT/EP2009/065999
§ 371 (c)(1),
(2), (4) Date: Aug. 4, 2011

(87) PCT Pub. No.: WO2010/063656
PCT Pub. Date: Jun. 10, 2010

(65) Prior Publication Data
US 2011/0285581 A1    Nov. 24, 2011

(30) Foreign Application Priority Data
Dec. 2, 2008    (EP) ..................... 08170468

(51) Int. Cl.
*G01S 13/88*    (2006.01)
*F03D 11/00*    (2006.01)
*G01S 13/04*    (2006.01)
*G01S 13/90*    (2006.01)
*G01S 13/91*    (2006.01)

(52) U.S. Cl.
CPC ............. *F03D 11/00* (2013.01); *G01S 13/9035* (2013.01); *G01S 2013/9082* (2013.01); *F05B 2260/80* (2013.01); *G01S 13/91* (2013.01); *Y02E 10/722* (2013.01); *G01S 13/04* (2013.01)
USPC .......... 342/25 F; 342/25 R; 342/118; 342/147

(58) Field of Classification Search
CPC .................... G01S 13/9035; G01S 2013/9082
USPC ....... 342/25 R–25 F, 118, 132–133, 140, 196
See application file for complete search history.

(56) References Cited

U.S. PATENT DOCUMENTS 5,017,922 A *   5/1991   Klausing et al. ............. 342/25 F
5,093,649 A     3/1992   Johnson
(Continued)

FOREIGN PATENT DOCUMENTS

| DE | 10 2006 006 962 A1 | 8/2007 |
| DE | 10 2007 004 027 A1 | 7/2008 |
| JP | 10-89235 A | 4/1998 |
| JP | 2006-125266 A | 5/2006 |

OTHER PUBLICATIONS

Klausing, Helmut, "Feasibility of a Synthetic Aperture Radar with Rotating Antennas (ROSAR)," Microwave Conference, 1989. 19th European , vol., no., pp. 287,299, Sep. 4-7, 1989 doi: 10.1109/EUMA.1989.333979.*

(Continued)

*Primary Examiner* — John B Sotomayor
*Assistant Examiner* — Marcus Windrich
(74) *Attorney, Agent, or Firm* — Baker & Hostetler LLP

(57) ABSTRACT

A surveillance system for detecting targets comprises a radar antenna mounted on a blade of a windmill.

9 Claims, 2 Drawing Sheets

(56) References Cited

U.S. PATENT DOCUMENTS

| | | | | |
|---|---|---|---|---|
| 5,777,573 | A | * | 7/1998 | Klausing et al. ............. 342/25 F |
| 6,781,540 | B1 | * | 8/2004 | MacKey et al. ............. 342/25 F |
| 7,710,307 | B2 | | 5/2010 | Weinzierl et al. |
| 2004/0150547 | A1 | * | 8/2004 | Suess et al. ................. 342/25 A |
| 2005/0042100 | A1 | | 2/2005 | Wobben |
| 2008/0260531 | A1 | * | 10/2008 | Stommel ......................... 416/31 |
| 2010/0265122 | A1 | * | 10/2010 | Oswald .......................... 342/136 |

OTHER PUBLICATIONS

Klausing, et al., "Feasibility of a Synthetic Aperture Radar with Rotating Antennas", 1990, IEEE International Radar Conference, pp. 51-56.

Mehrdad Soumekh, "Reconnaissance with Slant Plane Circular SAR Imaging", IEEE Transactions on Image Processing, Aug. 1, 1996, entire document, vol. 5, No. 1 IEEE Service Center, Piscataway, NJ, US, XP011026048.

I.G. Cumming, "Interpretations of the Omega-K Algorithm and Comparisons with Other Algorithms", IEEE 2003 International GeoScience and Remote Sensing Symposium, Jul. 21, 2003, pp. 1455-1458, vol. 3, IEEE, New York, NY, US, XP010704179.

H. Rudolf, et al., "Combination of Linear and Circular SAR for 3-D Features", GeoScience and Remote Sensing (IEEE International Remote Sensing—A Scientific Vision for Sustainable Development), Aug. 3-8, 1997, pp. 1551-1553, vol. 4, IEEE, New York, NY, US, XP010234505.

\* cited by examiner

SURVEILLANCE SYSTEM COMPRISING A RADAR ANTENNA MOUNTED ON A BLADE OF A WINDMILL

CROSS-REFERENCE TO RELATED APPLICATIONS

This application is a National Stage of International patent application PCT/EP2009/065999, filed on Nov. 27, 2009, which claims priority to foreign European patent application No. EP 08170468.6, filed on Dec. 2, 2008, the disclosures of which are incorporated by reference in their entirety.

FIELD OF THE INVENTION

The present invention relates to a surveillance system comprising a radar antenna mounted on a blade of a windmill. The invention is more particularly applicable to the domain of surveillance.

BACKGROUND

Some systems ensure surveillance of large air/sea/ground areas in the purpose of detecting objects such as aircrafts, vessels or vehicles, whether they are moving or not. They may basically consist of a network of radar systems. While the existing techniques focus on accurately determining range, i.e. the distance of the detected objects relatively to the radar, it is a remaining issue to better estimate the distance between the detected objects, so-called "cross-range". Indeed, the existing surveillance systems provide quite a low cross-range resolution.

Synthetic Aperture Radar (SAR) techniques have been used in the past in an attempt to estimate the cross-range between static objects for imaging of large ground areas by use of moving radars. In these techniques, the so-called "swath" is the area in which the cross-range between two objects can be estimated.

Klausing and Keydel disclosed a rotating SAR (ROSAR) mounted on the rotating wings of a helicopter for imaging the ground ("Feasibility of SAR with rotating antennas", 1990, IEEE International Radar Conference, pp. 51-56). In Klausing and Keydel, the swath is a ring-shaped area illuminated by the radar beam if the helicopter flies a stationary position. Klausing and Keydel also disclose an algorithm adapted to the ring-shaped swath. A major drawback is that it is difficult to fly a helicopter at a true stationary location.

Soumekh disclosed a circular SAR (CSAR) mounted under an airplane flying a circle for imaging the ground ("Reconnaissance with Slant Plane Circular SAR Imaging", 1996, IEEE Transactions on Image Processing, V5/no8, pp. 1252-1265). In Soumekh, the swath is a disc-shaped area illuminated by the radar beam if the airplane always flies the same circle. Soumekh also discloses an algorithm adapted to the disc-shaped swath. A major drawback is that it is difficult to fly a true circle at a constant altitude and speed.

Unfortunately, neither of these existing solutions is adapted to ensure surveillance of a large area, nor adapted to provide a permanent surveillance, nor adapted to accurately estimate cross-range between objects separated in the vertical dimension, such as aircrafts.

SUMMARY OF THE INVENTION

It is an aim of the present invention to provide a surveillance system adapted to large air/sea/ground areas with high cross-range resolution, which may be used to overcome at least some of the drawbacks described above. Thus, the present invention basically proposes to mount a SAR antenna on a windmill blade, below called "windmill-SAR" according to the invention, so as to improve the cross-range resolution in azimuth and elevation between air, ground and sea targets. This is motivated by a growing number of windmills together with their convenient heights and known circular motion. Another reason is that windmills are available in these areas that need reconnaissance and surveillance in security and/or military applications. At its most general, the invention proposes a surveillance system for detecting targets, the system comprising a radar antenna mounted on a blade of a windmill.

In a preferred embodiment, the system may comprise means to apply a synthetic aperture radar technique when the blade rotates, the swath of the so-formed synthetic aperture radar being a circle in a vertical plane.

For example, the radar may be a Frequency Modulated Continuous-Wave (FMCW) radar or a pulse radar pulsing a linear chirp.

Advantageously, the phase of the received echo when the waveform is reflected by the targets in the vicinity of the swath may form a Green's function, the system comprising means to apply an ω-k algorithm with Fourier transform of the Green's function, so as to establish a cross-range image containing the targets and estimate azimuth and elevation from the antenna to each target. The system may comprise means to calculate, based on azimuth and elevation to each target, the cross-range between targets.

Advantageously, a radar antenna may be mounted on each blade of the windmill or on each blade of each windmill of a windmill farm or may be mounted on each blade of each windmill located at an edge of the windmill farm.

Thus, an advantage provided by the present invention is that it makes it possible to easily build a permanent and very large area surveillance system, based on the number of existing windmill farms. The observed area can expand at the same high rate as the number of windmill farms. Moreover, the swath is vertical, thus enabling to estimate cross-range between targets separated in the vertical dimension, while almost simultaneously enabling to estimate the horizontal range from the windmill to the targets by virtue of a normal "non-SAR" processing. Enhanced cross-range between targets also means improving the target classification.

BRIEF DESCRIPTION OF THE DRAWINGS

Non-limiting examples of the invention are described below with reference to the accompanying drawings in which.

the FIG. 1 schematically illustrates the geometry of an examplary SAR radar according to the invention.

DETAILED DESCRIPTION

In the figures, like reference signs are assigned to like items.

Figure 1:
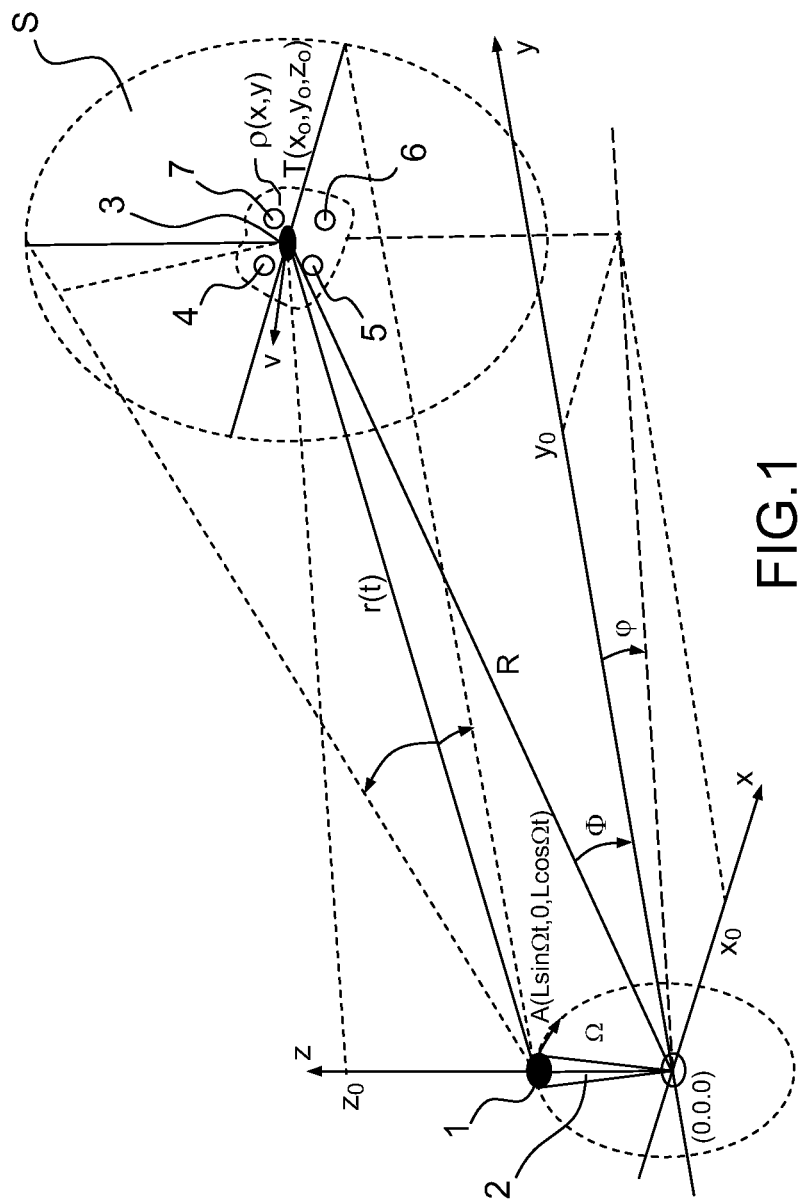

The FIG. 1 schematically illustrates the geometry of an examplary windmill-SAR according to the invention. The knowledge of the relative target-antenna motion is essential in the SAR techniques. However, it can be a priori unknown or poorly determined especially with non-cooperating targets. In such a radar system according to the invention, the antenna motion is known and can be used to improve the resolution, especially in azimuth and elevation. Thus, the SAR technique can improve the cross-range resolution because the received signal reveals both azimuth and elevation cross-ranges.

In this first embodiment, a single antenna 1 may be mounted on a single blade 2 of a windmill. L being the length of the blade and the rotation axis of the windmill blades being at (0,0,0), the antenna 1 rotates with a radial speed $\Omega$ in a vertical x-z plane from (0,0,L) to (L sin $\Omega$t,0,L cos $\Omega$t) at time t. A target 3 translates with a constant speed v in any direction from an initial position T($x_0$,$y_0$,$z_0$) located at azimuth $\phi$, elevation $\Phi$ and range R from (0,0,0). It is located at slant range r(t) from the antenna 1 at time t. At the range of the target, a disc-shaped swath S may be illuminated when the blade 2 rotates. As detailed below, the geometry of this exemplary SAR system according to the invention enables establishing a cross-range image $\rho$(x,z) containing the target 3 as well as other targets 4, 5, 6 and 7 in the swath S. Advantageously, the cross-range image $\rho$(x,z) can be established from the measurements of a received radio-frequency (RF) signal $s_{r,RF}$(t), based on the Fourier properties of a Green's function in the polar coordinates for example. Indeed, if $s_{RF}$(t) is a transmitted signal, its echo $s_{r,RF}$(t) from an object/area with the reflectivity function $\rho$ (x,z) in the cross-range plane x-z at slant range r(t) contains the initial cross-ranges ($x_0$, $z_0$). The estimation of the reflectivity function $\rho$ (x,z) at these initial positions may be feasible with agreeable resolution based on an algorithm known mostly as $\omega$-k algorithm that uses no approximation in the range r(t).

Figure 2:
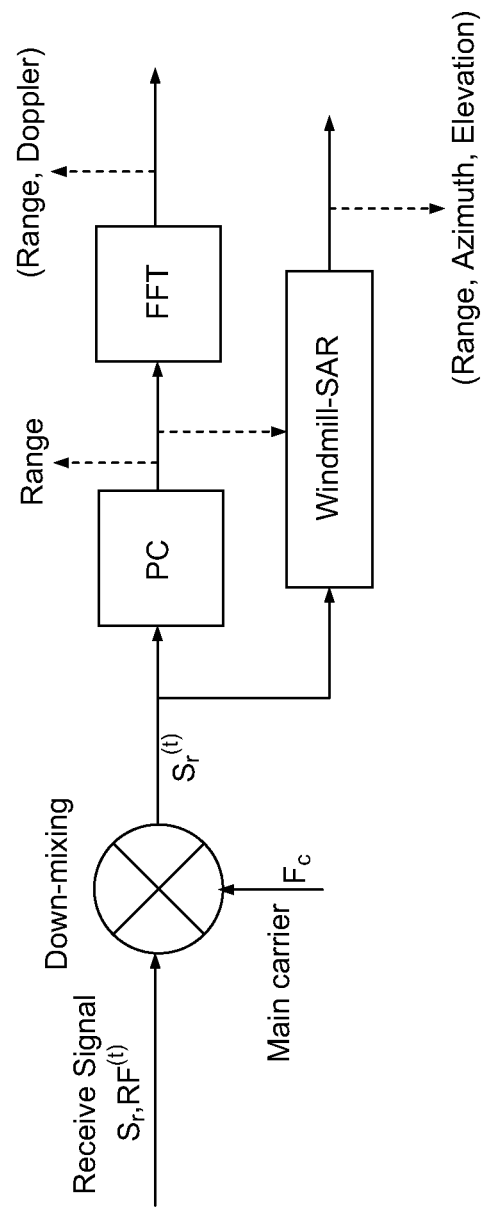
FIG. 2 schematically illustrates an exemplary block scheme according to the invention implemented in a pulse radar.

The FIG. 2 schematically illustrates an exemplary block scheme according to the invention, implemented as a software in a pulse radar with Pulse Compression (PC) and Fast Fourier Transform (FFT). FMCW radar with down-conversion by the whole transmitted sweep may also be applicable. For example, in pulse radar, the waveform may be chosen to be a linear chirp. In a first step, the received RF signal $s_{r,RF}$(t) is down-converted into a signal $s_r$(t) by a main carrier $f_c$. Then PC processing may be applied to the signal $s_r$(t) to estimate range r(t) and FFT processing may be applied to estimate Doppler. For improved azimuth and elevation resolution, this basic radar signal processing can advantageously be extended with a windmill-SAR processing according to the invention. Indeed, the phase of the received signal $s_{r,RF}$(t) that contains the slant range r(t) may be typical of a Green's function. The function itself and its Fourier transform are circularly symmetric functions what enables a separation of the contributions from the cross-range (x,z) from the contributions from the ground range y. This algorithm is based on the principles of those SAR algorithms known mostly as $\omega$-k algorithm but also called range-migration algorithm or wavefront reconstruction. Such SAR algorithms make no approximations in the range r(t), but uses the whole phase of the received signal.

In a further embodiment, an antenna may be mounted on each blade of the windmill.

In yet another embodiment, an ultimate radar network may be built from a windmill farm, with an antenna being mounted on each blade of each windmill of the farm. So as to limit possible interferences, antennas may be mounted only on blades of windmills located at an edge of the farm.

A further advantage provided by the present invention in any of its aspects is that it is a cost effective solution. It does not require particular means to control the rotation speed of the blades, which are already regulated at a constant speed. Only antennas have to be mounted on the blades, not a whole radar system. Thus, the emitter, the receiver and the processing units can be housed in the base of the windmill. Moreover, when the wind is not strong enough to drive the blades in rotation, multiple antennas mounted on the blades of a windmill can be used to apply a data-fusion technique, such as e.g. interferometry. Finally, it should not be underestimated that it is a green solution, which does not require consuming lots of fuel to fly airplanes or helicopters.

The invention claimed is:

1. A surveillance system for detecting targets, the surveillance system comprising:
   a radar antenna mounted on a blade of a windmill to illuminate a disc-shaped swath including the targets when the blade of the windmill rotates, and
   means for applying a synthetic aperture radar technique when the blade of the windmill rotates, wherein:
      the disc-shaped swath of the synthetic aperture radar is in a vertical plane,
      the disc-shaped swath is illuminated at a slant range of each of the targets when the blade of the windmill rotates, the slant range defining the location of each of the targets from the radar antenna as a function of time, and
      the surveillance system is configured to use the disc-shaped swath to estimate a cross-range between the targets or a horizontal range between one of the targets and a vertical plane defined by the rotation of the blade of the windmill.

2. The surveillance system as claimed in claim 1, wherein the radar is a pulse radar.

3. The surveillance system as claimed in claim 1, wherein the radar is a Frequency Modulated Continuous-Wave radar.

4. The surveillance system as claimed in claim 2, wherein a waveform pulsed by the radar is a linear chirp.

5. The surveillance system as claimed in claim 4, further comprising means for applying an $\omega$-k algorithm with Fourier transform of a Green's function, to establish a cross-range image $\rho$(x,z) containing targets and estimate azimuth and elevation from the radar antenna to each target of the targets.

6. The surveillance system as claimed in claim 5, further comprising means for calculating, based on the estimated azimuth and elevation to each target, the cross-range between the targets.

7. The surveillance system as claimed in claim 1, wherein a radar antenna is mounted on each blade of the windmill.

8. The surveillance system as claimed in claim 1, wherein a radar antenna is mounted on each blade of each windmill of a windmill farm.

9. The surveillance system as claimed in claim 1, wherein a radar antenna is mounted on each blade of each windmill located at an edge of a windmill farm.

* * * * *